United States Patent
Sugiyama

(10) Patent No.: US 9,081,216 B2
(45) Date of Patent: Jul. 14, 2015

(54) OPTICAL DEVICE HAVING OPTICAL MODULATORS

(71) Applicant: Fujitsu Optical Components Limited, Kanagawa (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 13/898,852

(22) Filed: May 21, 2013

(65) Prior Publication Data

US 2013/0251303 A1 Sep. 26, 2013

Related U.S. Application Data

(62) Division of application No. 12/783,966, filed on May 20, 2010, now Pat. No. 8,467,634.

(30) Foreign Application Priority Data

Jun. 15, 2009 (JP) ................. 2009-142224

(51) Int. Cl.
*G02B 6/12* (2006.01)
*G02F 1/035* (2006.01)
*G02F 1/225* (2006.01)

(52) U.S. Cl.
CPC ............... *G02F 1/035* (2013.01); *G02F 1/225* (2013.01); *G02F 2201/122* (2013.01); *G02F 2201/18* (2013.01)

(58) Field of Classification Search
USPC .......................................... 385/2–3
See application file for complete search history.

(56) References Cited

U.S. PATENT DOCUMENTS

| 6,678,428 B2 * | 1/2004 | Seino et al. ................. 385/2 |
| 7,471,853 B2 * | 12/2008 | Sugiyama ................. 385/3 |
| 2008/0212915 A1 | 9/2008 | Ichikawa et al. |

(Continued)

FOREIGN PATENT DOCUMENTS

| JP | 2007-57785 | 3/2007 |
| JP | 2008-11 6865 | 5/2008 |

OTHER PUBLICATIONS

Restriction Requirement mailed Jun. 1, 2012 for copending U.S. Appl. No. 12/783,966.
Office Action mailed Aug. 31, 2012 for copending U.S. Appl. No. 12/783,966.
Notice of Allowance mailed Feb. 19, 2013 for copending U.S. Appl. No. 12/783,966.

(Continued)

*Primary Examiner* — Eric Wong
(74) *Attorney, Agent, or Firm* — Staas & Halsey LLP

(57) ABSTRACT

An optical device includes first and second optical modulators formed on a substrate having electro-optical effect. The first optical modulator includes a first optical waveguide; a first signal electrode configured to provide a first data signal for the first optical waveguide; and a first DC electrode, arranged at an output side of the first signal electrode, and configured to provide first DC voltage for the first optical waveguide. The second optical modulator includes a second optical waveguide; a second signal electrode configured to provide a second data signal for the second optical waveguide; and a second DC electrode provided, arranged at an input side of the second signal electrode, and configured to provide second DC voltage for the second optical waveguide. Input portions of the first and second signal electrodes are arranged at a same side edge of the substrate.

4 Claims, 16 Drawing Sheets

(56) References Cited

U.S. PATENT DOCUMENTS

2009/0041472 A1  2/2009  Kawanishi et al.
2009/0238512 A1* 9/2009  Sugiyama ........................ 385/2

OTHER PUBLICATIONS

U.S. Appl. No. 12/783,966, filed May 20, 2010, Masaki Sugiyama, Fujitsu Optical Components Limited.

* cited by examiner

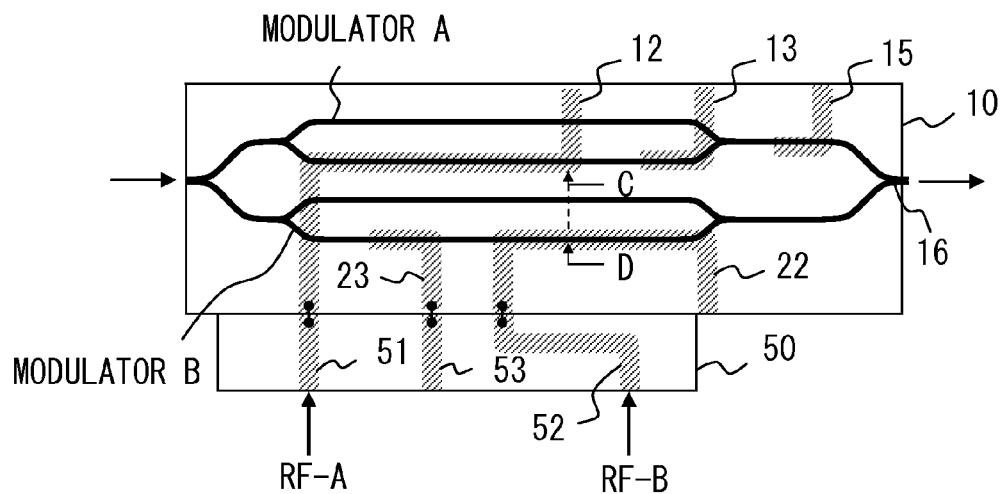
F I G. 8

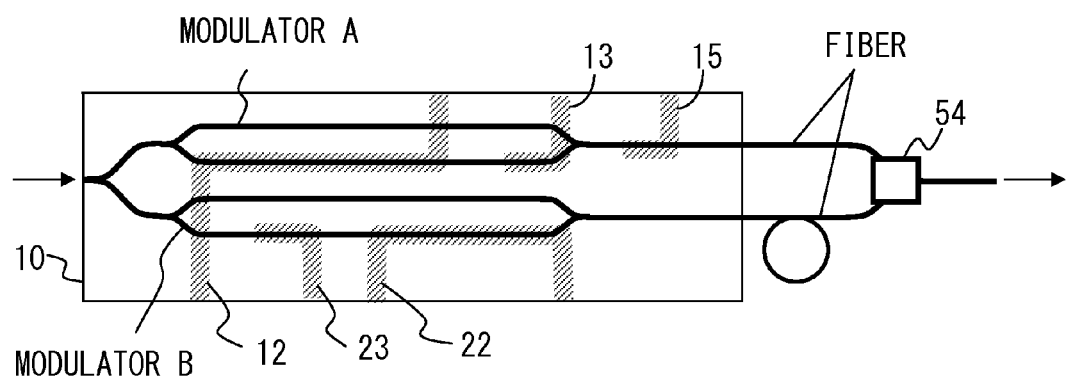
F I G. 9

OPTICAL DEVICE HAVING OPTICAL MODULATORS

CROSS-REFERENCE TO RELATED APPLICATIONS

This application is a divisional of U.S. Ser. No. 12/783,966, filed May 20, 2010, which is based upon and claims the benefit of priority of the prior Japanese Patent Application No. 2009-142224, filed on Jun. 15, 2009, the entire contents of which are incorporated herein by reference.

FIELD

The present invention relates to an optical device provided with a plurality of optical modulators.

BACKGROUND

An optical transmitter used in an optical communication system is generally provided with an optical modulator for modulating carrier light depending on transmission data. A well-known embodiment of an optical modulator has a configuration including a Mach-Zehnder modulator.

FIG. 1 illustrates a configuration of one example of a Mach-Zehnder modulator. In FIG. 1, an optical waveguide (a splitting section 101, a pair of optical waveguides 102a and 102b, and a combining section 103) is formed on a substrate 100. The substrate 100 has an electro-optical effect. The splitting section 101 splits input light and guides the light to the optical waveguides 102a and 102b. In this example, the input light is CW light of a TM mode. The optical waveguides 102a and 102b propagate the input light, respectively. The combining section 103 combines optical signals propagated through the optical waveguides 102a and 102b. A signal electrode 104 is formed on one of the optical waveguides 102a and 102b (the optical waveguide 102b in the example illustrated in FIG. 1). A DC electrode 105 is also formed on one of the optical waveguides 102a and 102b (the optical waveguide 102b in the example illustrated in FIG. 1).

In the Mach-Zehnder modulator with the configuration above, when a data signal is provided for the signal electrode 104, the refractive index of the optical waveguide is controlled based on the data signal, and the phase difference between the optical waveguides 102a and 102b is changed by Mach-Zehnder interference. Therefore, an optical signal modulated depending on the data signal is generated. By providing DC bias voltage through the DC electrode 105, the bias point of the Mach-Zehnder modulator is adjusted. The DC bias voltage is adjusted by feedback control so that, for example, the output power is minimized when the data signal is OFF.

Recently, a transmitting system using a plurality of optical modulators has been implemented for large capacity optical signals. For example, multi-level modulation such as QPSK (including DQPSK) etc., polarization multiplexing, etc. has been proposed.

A polarization multiplexing modulator includes, for example as illustrated in FIG. 2, a pair of Mach-Zehnder modulators 110A and 110B, and a polarization beam coupler (PBC) 111 for polarization multiplexing the output signals of the Mach-Zehnder modulators 110A and 110B. Each of the Mach-Zehnder modulators 110A and 110B may be realized by the Mach-Zehnder modulator illustrated in FIG. 1 in this example. The polarization beam coupler 111 multiplexes polarizations orthogonal to each other (TE mode, TM mode).

However, with this configuration, the size of the optical transmitter increases. That is, to reduce the size of the optical transmitter, it is desired that a plurality of optical modulators are integrated on one chip.

FIG. 3 illustrates configuration of an optical device having a plurality of optical modulators on one chip. The optical device includes a splitting waveguide 120 and Mach-Zehnder modulators A and B on the substrate 100. The splitting waveguide 120 splits the input CW light and guides the resultant light to the Mach-Zehnder modulators A and B. The configuration and operation of each of the Mach-Zehnder modulators A and B are similar to the one described above with reference to FIG. 1. However, a data signal RF-A is provided for the Mach-Zehnder modulator A using a signal electrode 104A, and a data signal RF-B is provided for the Mach-Zehnder modulator B using a signal electrode 104B. Therefore, the optical device generates modulated optical signal A corresponding to the data signal RF-A and modulated optical signal B corresponding to the data signal RF-B. The modulated optical signal A and the modulated optical signal B are multiplexed by the polarization beam coupler 111.

The optical device provided with a plurality of Mach-Zehnder modulators is described, for example, in the Japanese Laid-open Patent Publication No. 2008-116865 or the Japanese Laid-open Patent Publication No. 2007-57785.

In the optical device provided with a plurality of optical modulators on one chip, it is often requested that an input ports for inputting data signals to the optical modulators are arranged on one side of the chip. However, an optical connector for inputting data signal normally has a size of several millimeters. Therefore, the interval S illustrated in FIG. 3 cannot be smaller than the optical connector.

On the other hand, in order to reduce the drive voltage of each optical modulator, it is desired to have a longer interaction length (length of an optical waveguide whose characteristic is controlled by providing a signal with an electrode). However, to have a longer interaction length of the Mach-Zehnder modulator B with the configuration illustrated in FIG. 3, the signal electrode 104B for providing the data signal RF-B is formed to be extended from the input port (RF-B) toward the input side of the modulator. That is, the signal electrode 104B is excessively longer by the length of Lf. When the signal electrode is longer, the high frequency component of the data signal is attenuated, and the modulation band is degraded. That is, there is the possibility that the waveform of the modulation signal is degraded, and the communication quality is reduced. If the substrate 100 is longer, it is possible to have a shorter path length of the signal electrode while maintaining the interval between the input ports of the electric signals. However, the configuration does not satisfy the request of downsizing the optical device.

As described above, it is difficult to maintain the quality of modulated signal of an optical device provided with a plurality of optical modulators.

SUMMARY

According to an aspect of an invention, an optical device includes first and second optical modulators formed on a substrate having electro-optical effect. The first optical modulator includes: a first optical waveguide; a first signal electrode configured to provide a first data signal for the first optical waveguide; and a first DC electrode, arranged at an output side of the first signal electrode, and configured to provide first DC voltage for the first optical waveguide. The second optical modulator includes: a second optical waveguide; a second signal electrode configured to provide a second data signal for the second optical waveguide; and a second DC electrode provided, arranged at an input side of the second signal electrode, and configured to provide second DC voltage for the second optical waveguide. Input portions of the first and second signal electrodes are arranged at a same side edge of the substrate.

According to another aspect of the invention, an optical device includes first and second QPSK optical modulators formed on a substrate having electro-optical effect. Each of the first and second QPSK optical modulators includes a pair of sub-Mach-Zehnder waveguides. In the first QPSK optical modulator, a first phase control electrode for providing a control signal to control a phase of the pair of sub-Mach-Zehnder waveguides is formed at an output side of the pair of sub-Mach-Zehnder waveguides. In the second QPSK optical modulator, a second phase control electrode for providing a control signal to control a phase of the pair of sub-Mach-Zehnder waveguides is formed at an input side of the pair of sub-Mach-Zehnder waveguides.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an optical device according to the fourth embodiment.

FIG. 9 illustrates an optical device according to the fifth embodiment.

DESCRIPTION OF EMBODIMENTS

Figure 4:
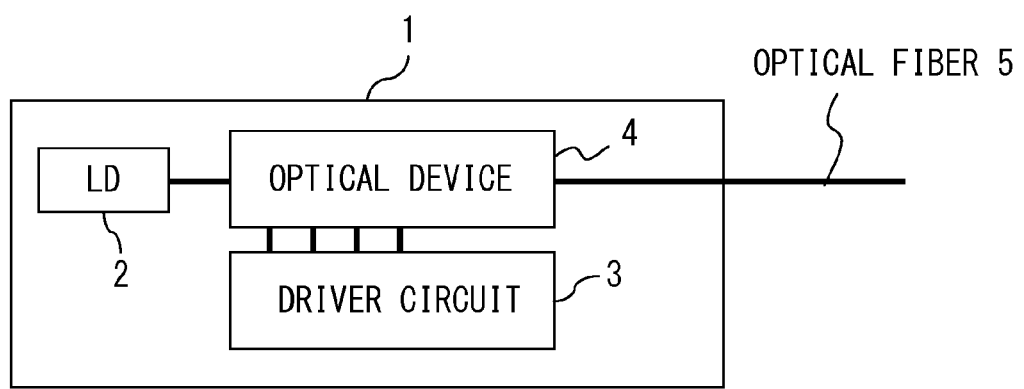
FIG. 4 illustrates an optical transmitter provided with the optical device according to the embodiments.

FIG. 4 illustrates an optical transmitter provided with the optical device according to embodiments. The optical transmitter 1 includes a laser light source (LD) 2, a driver circuit 3, and an optical device 4.

In the embodiment, the laser light source 2 generates CW light with a certain frequency. The CW light is not specifically limited, but may be linearly polarized light, for example. The driver circuit 3 generates a data signal based on transmission data. The generated data signal is provided for the optical device 4. The driver circuit 3 is connected to the optical device 4 via, but not specifically limited to, a coaxial cable.

The optical device 4 is provided with a plurality of optical modulators, and modulates input CW light according to the data signal provided from the driver circuit 3. Each optical modulator is, not specifically limited to, a Mach-Zehnder modulator, for example. The optical device 4 is, for example, an QPSK (including DQPSK) optical modulator, or a polarization multiplexing modulator. The optical device 4 may include a plurality of QPSK modulators or a plurality of polarization multiplexing modulators. A modulated optical signal generated by the optical device 4 is transmitted through an optical fiber 5.

Figure 5:
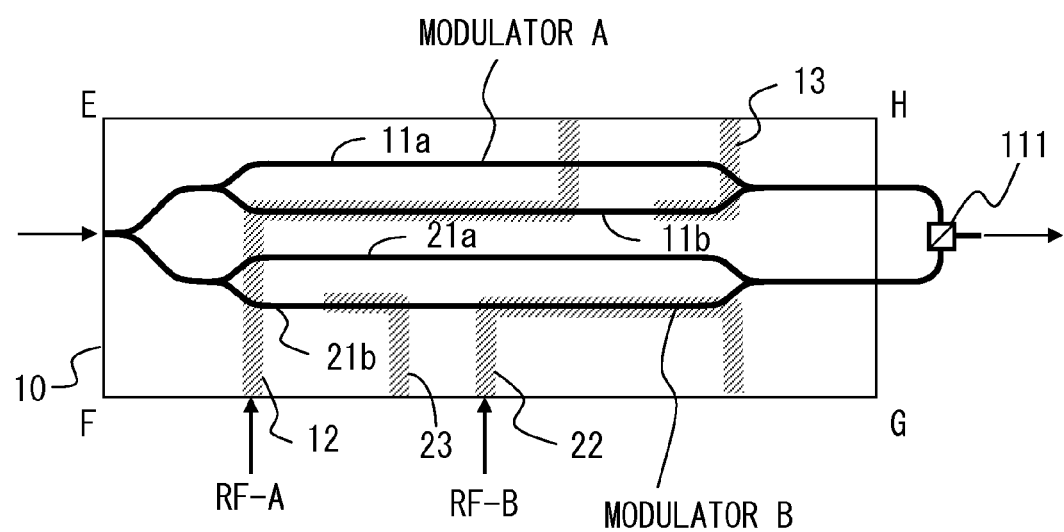
FIG. 5 illustrates an optical device according to the first embodiment.

FIG. 5 illustrates an optical device according to the first embodiment. The optical device corresponds to the optical device 4 illustrated in FIG. 4, and the CW light generated by the laser light source 2 is input to the optical device. The optical device receives data signals (RF-A, RF-B) generated by the driver circuit 3.

A substrate 10 is an electro-optical substrate having an electro-optical effect, and the optical characteristic (refractive index etc.) of the substrate 10 changes depending on the provided electric signal. The substrate 10 is realized by an electro-optical crystal such as $LiNbO_3$ (LN), $LiTaO_2$, etc. The substrate 10 is rectangular in this embodiment.

Optical modulators A and B are formed on the substrate 10. Here, the optical modulators A and B may be formed in the surface area of the substrate 10. The input CW light is split by a splitting waveguide, and guided to the optical modulators A and B. The splitting ratio by the splitting waveguide is, for example, 1:1. That is, the splitting waveguide equally splits the input CW light. The splitting waveguide may be realized by a Y coupler.

The optical modulator A is a Mach-Zehnder modulator in this embodiment, and includes an optical splitting element, a pair of optical waveguides 11a and 11b, and an optical combining element. The optical waveguides 11a and 11b are formed in parallel or substantially in parallel to each other. The input light to the optical modulator A is split by the optical splitting element and guided to the optical waveguides 11a and 11b. The optical combining element combines optical signals respectively output from the optical waveguides 11a and 11b.

The optical waveguide is formed by diffusing metal such as Ti etc. on the surface area of the substrate 10. Otherwise, the optical waveguide may be formed by proton exchanging in benzoic acid after patterning on the surface of the substrate 10.

The optical modulator A includes a signal electrode 12 for providing the data signal RF-A for the optical waveguide. The optical modulator A also includes a DC electrode 13 for providing DC bias voltage for the optical waveguide. The signal electrode 12 and the DC electrode 13 are formed along the optical waveguide 11b. When the substrate 10 is a Z cut substrate, modulation and bias control are performed using a change of the refractive index by the electric field in the Z direction (direction perpendicular to the substrate 10). In this case, the signal electrode 12 and the DC electrode 13 are formed right on or above the optical waveguide 11b.

The optical modulator B basically has the same configuration as the optical modulator A, and includes optical waveguides 21a and 21b, a signal electrode 22, and a DC electrode 23. However, the signal electrode 22 of the optical modulator B is provided with the data signal RF-B. The respective DC bias voltages provided for the optical modulators A and B are independently controlled.

Although omitted in FIG. 5, a grounding electrode may be formed in an area where the signal electrodes 12 and 22 and the DC electrodes 13 and 23 are not formed on the surface of the substrate 10. Since the signal electrode 12 is formed on the optical waveguide 11b, the grounding electrode is formed on the optical waveguide 11a. Likewise, since the signal electrode 22 is formed on the optical waveguide 21b, the grounding electrode is formed on the optical waveguide 21a. In addition, the respective output terminals of the signal electrodes 12 and 22 are connected to the grounding electrodes through termination resistors. With the configuration, a coplanar electrode is realized.

Although not illustrated in the attached drawings, a buffer layer may be formed between the substrate 10 and each electrode (the signal electrodes 12 and 22, the DC electrodes 13 and 23, and the grounding electrodes). The buffer layer is provided for preventing the light propagating through the optical waveguides from being absorbed by the electrodes. The buffer layer is realized by $SiO_2$ with thickness of about 0.2 through 2.0 μm.

In the optical device with the configuration above, the optical modulator A generates the modulated optical signal A corresponding to the data signal RF-A provided for the signal electrode 12. Likewise, the optical modulator B generates the modulated optical signal B corresponding to the data signal RF-B provided for the signal electrode 22. The modulated optical signals A and B may be transmitted through respective optical fibers, or may be transmitted through one optical fiber after combined or multiplexed.

In the embodiment illustrated in FIG. 5, the optical device is used for a polarization multiplexing modulator. That is, a pair of modulation signals generated by the optical modulators A and B are multiplexed by the polarization beam coupler 111. When the optical device according to the embodiment is used as a QPSK modulator, a phase shift element for providing a phase difference π/2 between the optical modulators A and B and a combining waveguide for combining the pair of modulated signals generated by the optical modulators A and B are formed on the substrate 10, for example.

The bias point or zero point of the optical modulator A is adjusted by performing feedback control on the DC bias voltage of the DC electrode 13. Likewise, the bias point or zero point of the optical modulator B is adjusted by performing feedback control on the DC bias voltage of the DC electrode 23.

The input portions of the signal electrodes 12 and 22 are provided on the same side edge of the substrate 10. The input portion of the signal electrode 12 refers to the end portion of the signal electrode 12 (or a port or a connector provided at the end portion of the signal electrode 12) to which the data signal RF-A is input. Likewise, the input portion of the signal electrode 22 refers to the end portion of the signal electrode 22 (or a port or a connector provided at the end portion of the signal electrode 22) to which the data signal RF-B is input. The side edge of the substrate 10 refers to an end portion other than the input-side end portion or the output-side end portion of the substrate 10. In the example illustrated in FIG. 5, the shape of the substrate 10 is a rectangle EFGH. In this example, the side FG and the side EH may be the "side edge" of the substrate 10. The input portions of the signal electrodes 12 and 22 are provided near the side FG of the substrate 10.

In the optical device with the configuration above, it is assumed that the bit rates of the data signals RF-A and RF-B are very high (for example, several Gbit/s through several tens Gbit/s) in this embodiment. Therefore, the data signals RF-A and RF-B are provided through, for example, a coaxial cable to suppress the influence of noise. However, there is a limit to downsize the connector for terminating the coaxial cable. Therefore, the input portions of the signal electrodes 12 and 22 are arranged at intervals larger than a specified interval determined according to the size of the connector.

On the other hand, since the DC bias voltage is hardly subject to the influence of noise, it is provided through simple wiring. That is, the size of the input portions of the DC electrodes 13 and 23 and the size of the wiring for providing DC bias voltage for the DC electrodes 13 and 23 may be reduced. Therefore, the input portion of the DC electrodes 13 and/or 23 may be arranged in the space between the input portions of the signal electrodes 12 and 22. In the example illustrated in FIG. 5, the input portion of the DC electrode 23 is arranged in the space between the input portions of the signal electrodes 12 and 22.

Furthermore, in the optical modulator A, the DC electrode 13 is provided at the output side of the signal electrode 12. That is, in the optical modulator A, the input light propagates through the interaction area by the DC electrode 13 after propagating through the interaction area by the signal electrode 12. On the other hand, in the optical modulator B, the DC electrode 23 is provided at the input side of the signal electrode 22. That is, in the optical modulator B, the input light propagates through the interaction area by the signal electrode 22 after propagating through the interaction area by the DC electrode 23.

With the configuration illustrated in FIG. 5, the signal electrode 12 and the DC electrode 13 are formed along the optical waveguide 11b in the optical modulator A, but the signal electrode 12 and the DC electrode 13 may be formed along the optical waveguide 11a. It is also possible that one of the electrodes (12, 13) is formed on the optical waveguide 11a, and the other electrode is formed on the optical waveguide 11b. The variations may be similarly used also in the optical modulator B.

Figure 1:
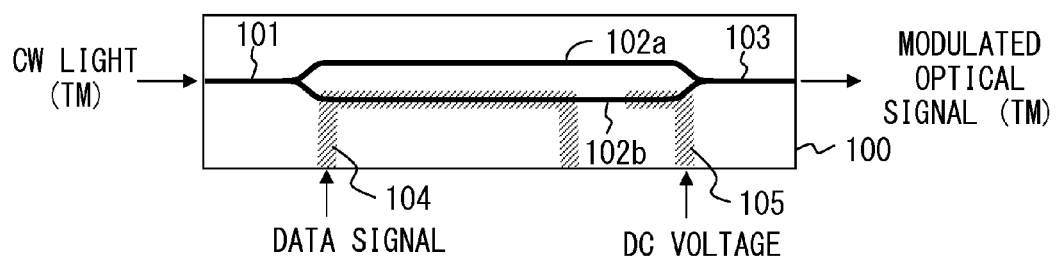
FIG. 1 illustrates a configuration of a Mach-Zehnder modulator.
Figure 2:
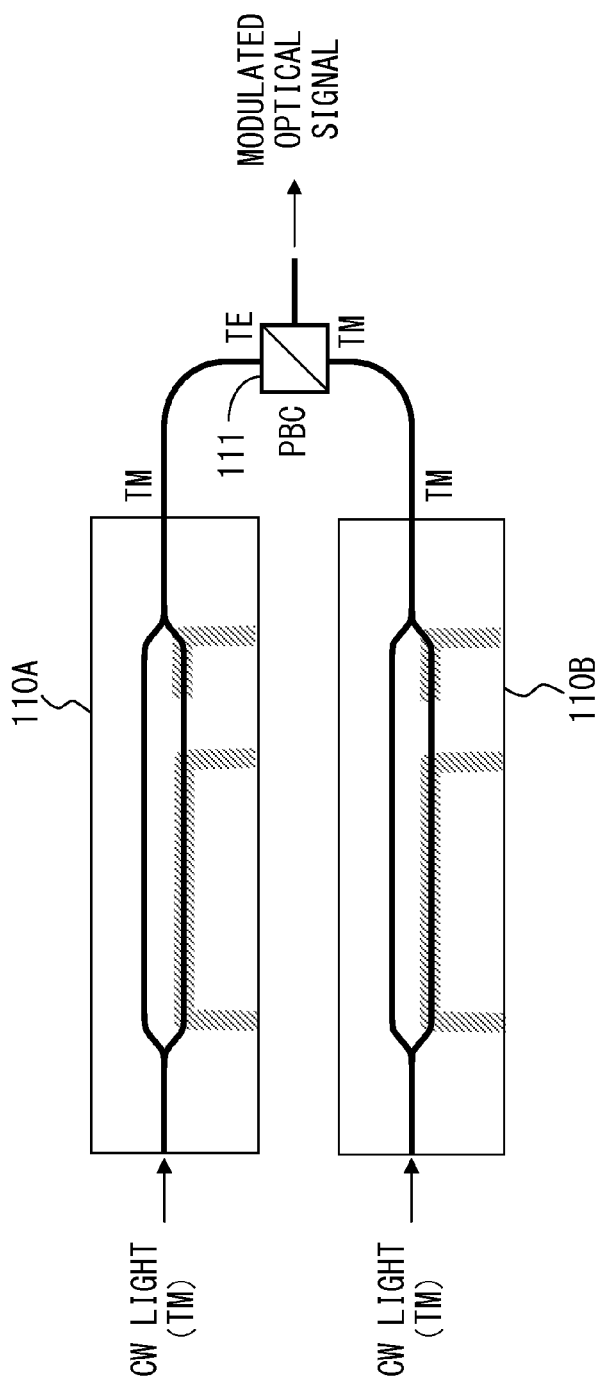
FIG. 2 illustrates an optical device provided with a plurality of optical modulators.
Figure 3:
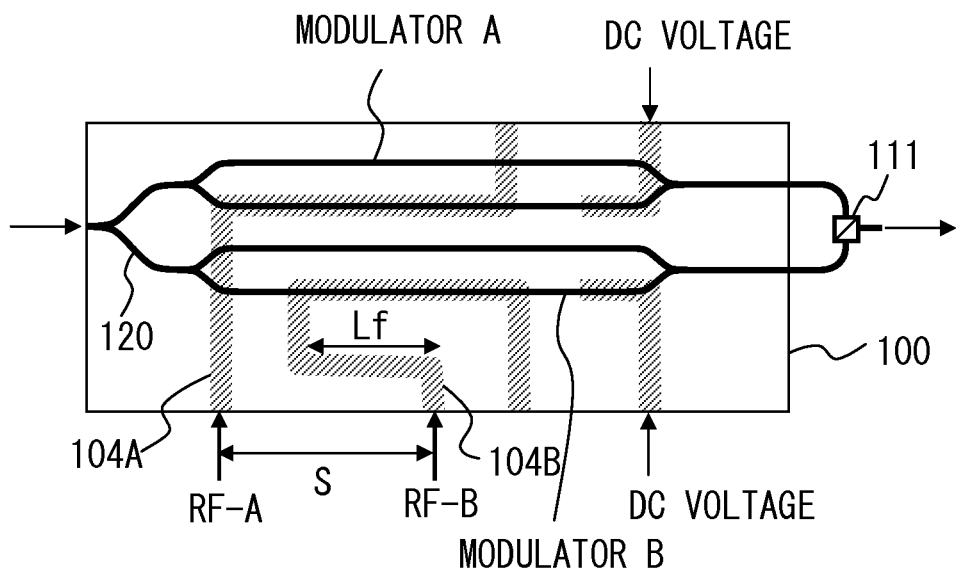
FIG. 3 illustrates an optical device provided with a plurality of optical modulators on one chip.

With the configuration above, for example, in the optical modulator B, the interaction area by the signal electrode 22 is formed up to the end portion of the optical waveguide 21b. Therefore, a sufficient interaction length is guaranteed without leading the signal electrode 22 to the input side of the optical modulator B. According to the configuration of the embodiment, when the same interaction length is maintained, the path length of the signal electrode is shorter than in the configuration illustrated in FIG. 3. That is, the signal electrode 22 of the embodiment is shorter than the signal electrode 104B illustrated in FIG. 3. Therefore, in the optical device of the embodiment, the modulation band is improved, and the quality of a modulation signal is enhanced.

In the optical device of the embodiment, it is preferable that the interaction length by the signal electrode 12 in the optical modulator A and the interaction length by the signal electrode 22 in the optical modulator B are equal to each other. If the interaction lengths of the optical modulators A and B are equal to each other, the drive voltages of the optical modulators A and B are also equal to each other, thereby simplifying the configuration of the driver circuit 3. Otherwise, since the modulated signals A and B respectively generated by the optical modulators A and B are well balanced, the quality of the multiplexed signal (QPSK modulated signal or polarization multiplexed signal) is improved.

In addition, it is also preferable that the interaction length by the DC electrode 13 in the optical modulator A and the interaction length by the DC electrode 23 in the optical modulator B are equal to each other. In this case, since the Vπ of the DC electrode may be equal to each other between the optical modulators A and B, the power supply for bias adjustment may be shared.

Figure 6:
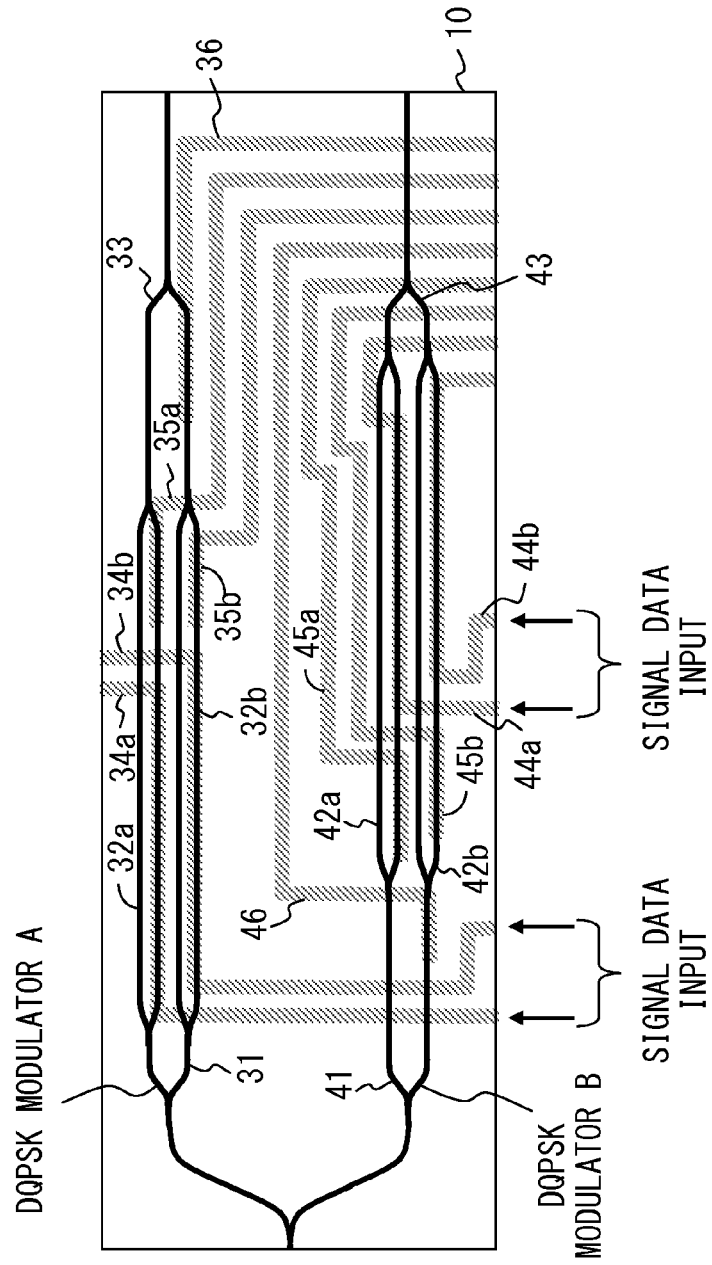
FIG. 6 illustrates an optical device according to the second embodiment.

FIG. 6 illustrates an optical device according to the second embodiment. The optical device of the second embodiment includes two DQPSK modulators A and B on the substrate 10. The input light is split to be guided to the DQPSK modulators A and B.

The DQPSK modulator A is provided with a splitting waveguide 31, a pair of sub-Mach-Zehnder waveguides 32a and 32b and a combining waveguide 33. The input light to the DQPSK modulator A is split by the splitting waveguide 31, and guided to the sub-Mach-Zehnder waveguides 32a and 32b. The output optical signals of the sub-Mach-Zehnder waveguides 32a and 32b are combined by the combining waveguide.

The sub-Mach-Zehnder waveguides 32a and 32b are respectively provided with signal electrodes 34a and 34b and DC electrodes 35a and 35b. The interaction areas of the DC electrodes 35a and 35b are formed on the output sides of the interaction areas of the signal electrodes 34a and 34b, respectively.

Furthermore, the DQPSK modulator A includes a phase shift element for providing a specified phase difference (for example, π/2) between the sub-Mach-Zehnder waveguides 32a and 32b. The phase shift element is realized by a phase control electrode 36 for providing a control signal to the output waveguide of one of the sub-Mach-Zehnder waveguides 32a and 32b (the sub-Mach-Zehnder waveguide 32b in the embodiment). The control signal of the phase control electrode 36 is generated by feedback control performed while monitoring the output signal of the DQPSK modulator A, for example.

The configuration of the DQPSK modulator B is basically the same as the configuration of the DQPSK modulator A. That is, the DQPSK modulator B includes a splitting waveguide 41, sub-Mach-Zehnder waveguides 42a and 42b, a combining waveguide 43, signal electrodes 44a and 44b, DC electrodes 45a and 45b, and a phase control electrode 46. In the DQPSK modulator B, the interaction areas of the DC electrodes 45a and 45b are formed on the input side of the interaction areas of the signal electrodes 44a and 44b, respectively. In addition, in the DQPSK modulator B, the phase shift element is realized by the phase control electrode 46 for providing a control signal for the input waveguide of one of the sub-Mach-Zehnder waveguides 42a and 42b (the sub-Mach-Zehnder waveguide 42b in the embodiment).

As described, in the DQPSK modulator A, the input light passes the interaction areas of the signal electrodes 34a and 34b, the interaction areas of the DC electrodes 35a and 35b, and the interaction area of the phase control electrode 36 in this order. On the other hand, in the DQPSK modulator B, the input light passes the interaction area of the phase control electrode 46, the interaction areas of the DC electrodes 45a and 45b, and the interaction areas of the signal electrodes 44a and 44b in this order. Therefore, following three conditions for the layout of the modulator are satisfied.
(1) The input portions of the signal electrodes 34a, 34b, 44a, 44b are arranged at the same side edge of the substrate 10.
(2) The intervals between input portions of the signal electrodes 34a, 34b, 44a, 44b are relatively wide.
(3) The path lengths of the signal electrodes 34a, 34b, 44a, 44b are not long.

In the DQPSK modulator A with the configuration above, the DC electrodes 35a and 35b may be arranged on the input side of the signal electrodes 34a and 34b, respectively. In this case, in the DQPSK modulator B, the DC electrodes 45a and 45b are arranged on the output side of the signal electrodes 44a and 44b, respectively.

In addition, the DC electrodes 35a, 35b, 45a, 45b, and the phase control electrodes 36 and 46 pass the area between the DQPSK modulators A and B. According to the configuration, the input portions of the electrodes 35a, 35b, 36, 45a, 45b 46 may be arranged closely. In the optical device illustrated in FIG. 6, the input portions of the DC electrodes 35a, 35b, 45a, 45b, and the phase control electrodes 36 and 46 are arranged in the output side areas of the DQPSK modulator B. Therefore, these electrodes are easily connected and wired to an external circuit.

Figure 7:
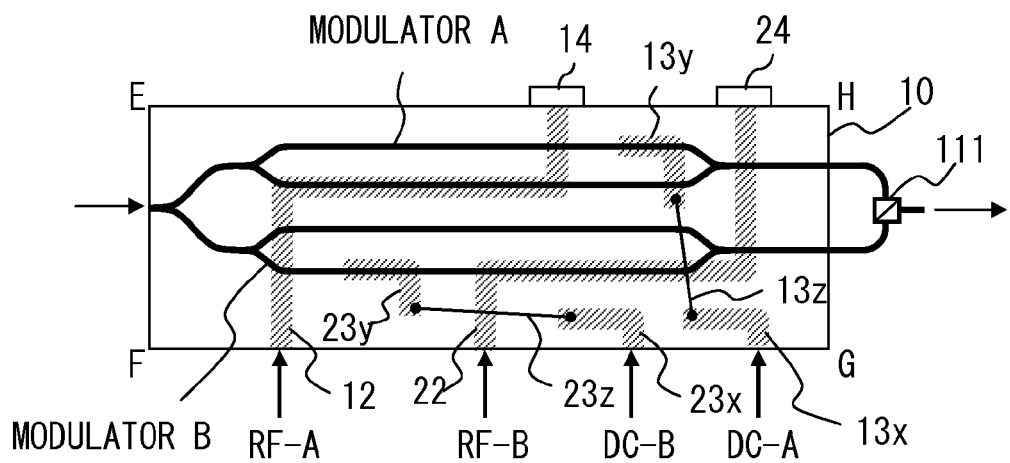
FIG. 7 illustrates an optical device according to the third embodiment.

FIG. 7 illustrates an optical device according to the third embodiment. The configuration of the optical device according to the third embodiment is similar to the configuration according to the first embodiment illustrated in FIG. 5. However, in the third embodiment, the electrode for providing the DC bias voltage for the optical modulator A is separated into a DC electrode 13x and a DC electrode 13y. The DC electrode 13x is formed at the end portion of the substrate 10. The DC electrode 13y is formed on and near the optical waveguide of the optical modulator A. The DC electrodes 13x and 13y are connected to each other by a bonding wire 13z. In this case, the bonding wire 13z bridges over the signal electrode 22.

Likewise, an electrode for providing DC bias voltage for the optical modulator B is separated into a DC electrode 23x and a DC electrode 23y. The DC electrodes 23x and 23y are connected to each other by a bonding wire 23z. The bonding wire 23z bridges over the signal electrode 22.

According to the configuration above, a terminator 14 of the data signal RF-A and a terminator 24 of the data signal RF-B are provided on the same side edge of the substrate 10. In the example illustrated in FIG. 7, the shape of the substrate 10 is a rectangle EFGH, and the terminators 14 and 24 are provided near the side edge EH. The terminators 14 and 24 are realized by, for example, connecting the signal electrodes 12 and 22 to the grounding electrode by a resistor element of a specified resistance value.

FIG. 8 illustrates an optical device according to the fourth embodiment. The optical device of the fourth embodiment is a QPSK modulator (or DQPSK modulator). The configurations of the optical modulators A and B are basically the same as in the first embodiment.

However, in the fourth embodiment, the optical signals output from the optical modulators A and B is multiplexed on the substrate 10, and the multiplexed signal is output. The optical device includes a phase shift element for providing a specified phase difference (for example, π/2) between the optical modulators A and B. The phase shift element is realized by a phase control electrode 15 for providing a control signal for the output waveguide of one of the optical modulators A and B (optical modulator A in the embodiment). The control signal of the phase control electrode 15 is generated by, for example, the feedback control performed while monitoring the output signal of the optical modulator A or the optical device.

In the QPSK modulator, the timing of the data signals are appropriately adjusted between the optical modulators A and B. In the example illustrated in FIG. 8, the data signals RF-A and RF-B are adjusted such that a pair of optical signals are synchronized with each other at a combining point 16. In this case, for example, an adjustment is made to synchronize the data signal RF-A at a position C with the data signal RF-B at a position D. The optical path length from the position C to the combining point 16 is equal to the optical path length from the position D to the combining point 16.

However, the path length from the input portion of the signal electrode 12 to the position C is not always equal to the path length from the input portion of the signal electrode 22 to the position D. Therefore, the optical device according to the fourth embodiment includes a mechanism of adjusting the timing between the data signals RF-A and RF-B. The adjustment mechanism is also preferable when realizing a dual drive modulator using the optical modulators A and B.

With the configuration illustrated in FIG. 8, the timing of the data signals RF-A and RF-B is adjusted before input to the substrate 10. That is, the optical device includes a relay substrate 50. The material of the relay substrate 50 is not specifically limited, but may be different from the material of the substrate 10. Signal electrodes 51 and 52 and a DC electrode 53 are formed on the relay substrate 50. The signal electrodes 51 and 52 are respectively connected to the input portions of the signal electrodes 12 and 22 formed on the substrate 10 through bonding wires. The DC electrode 53 is connected to the input portion of the DC electrode 23 formed on the substrate 10 through a bonding wire. The data signals RF-A and RF-B generated by the driver circuit 3 are input to the substrate 10 through the signal electrodes 51 and 52, respectively.

The layout of the signal electrodes 51 and 52 is designed such that, for example, the path length from the input terminal of the signal electrode 51 to the position C is equal to the path length from the input terminal of the signal electrode 52 to the position D. With the configuration, the driver circuit 3 outputs the data signals RF-A and RF-B with the same timing. It is not necessary that the driver circuit 3 outputs the data signals RF-A and RF-B with the same timing. That is, the modulated signals A and B may be synchronized with each other by outputting the data signals RF-A and RF-B with appropriate timing.

The above-mentioned adjustment mechanism may also be realized by adjusting the timing of the pair of optical signals output from the optical modulators A and B. For example, in the fifth embodiment illustrated in FIG. 9, the optical signals output from the optical modulators A and B are multiplexed by an optical coupler 54 provided outside the substrate 10. In this case, the length of the optical fibers for connection between the optical modulators A and B and the optical coupler 54 are designed such that the pair of optical signals are synchronized with each other in the optical coupler 54.

Figure 10:
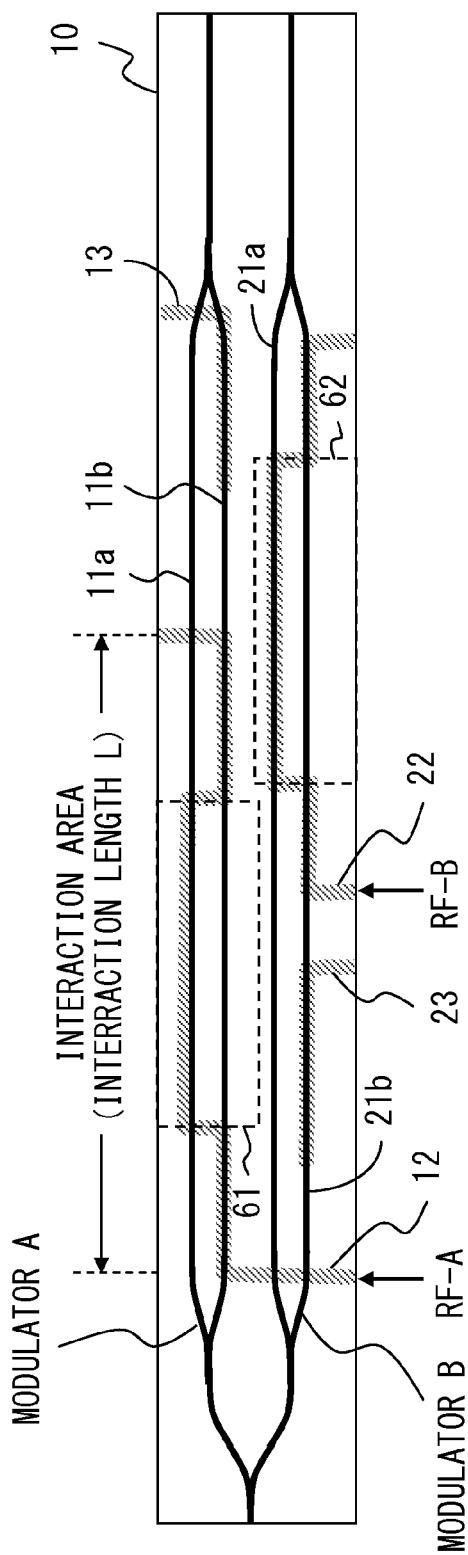
FIG. 10 illustrates an optical device according to the sixth embodiment.

FIG. 10 illustrates an optical device according to the sixth embodiment. The configuration according to the sixth embodiment is similar to the first embodiment illustrated in FIG. 5. However, the sixth embodiment includes the configuration of suppressing the chirp of a modulated optical signal.

In the sixth embodiment, domain inversion areas 61 and 62 are formed on the substrate 10. The domain inversion area has an electro-optical characteristic different from that of the non-domain inversion area. For example, assuming that the refractive index of the non-domain inversion area is high when an applied voltage is high, the refractive index becomes low when the applied voltage is high in the domain inversion area. In the optical modulators A and B, a part of the interaction area by the signal electrode is arranged in the domain inversion area.

In the optical modulator A, the signal electrode 12 is formed along the optical waveguide 11*b* in the non-domain inversion area, and is formed along the optical waveguide 11*a* in the domain inversion area 61. In this case, the length of the domain inversion area 61 is half or substantially half of the interaction length L. With the configuration, the chirp of the optical modulator A is reduced to substantially zero. In addition, the domain inversion area 61 is arranged at the central portion of the interaction area. Thus, zero-chirp is realized in a wide band. Also in the optical modulator B, as in the optical modulator A, zero-chirp is realized by using the domain inversion area 62.

Thus, according to the sixth embodiment, the chirp of the modulated optical signal is suppressed using the domain inversion area. Therefore, the quality of the modulated signal output from the optical device is improved.

Figure 11:
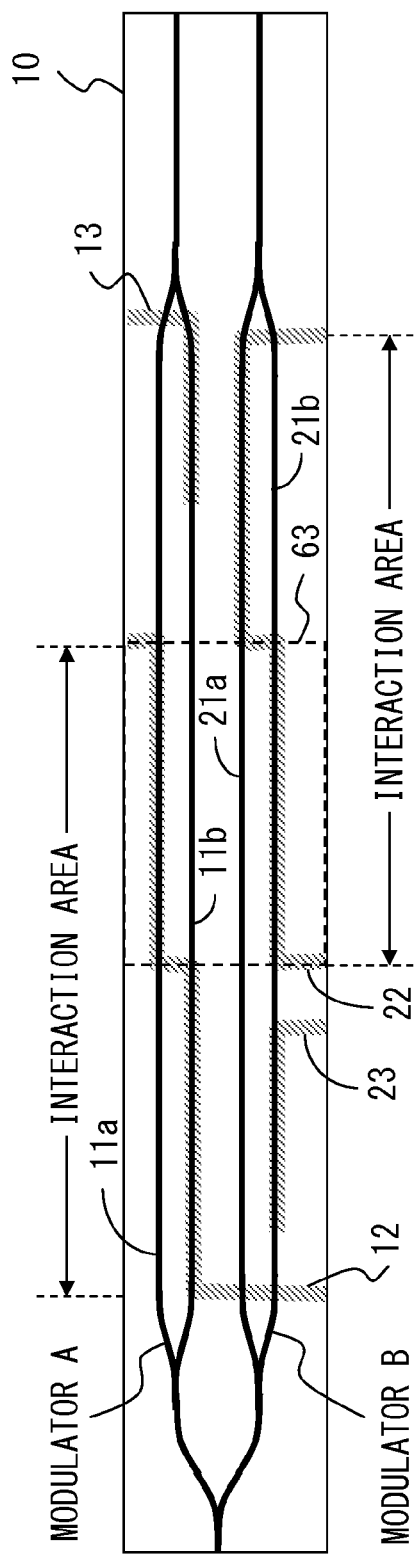
FIG. 11 illustrates an optical device according to the seventh embodiment.

FIG. 11 illustrates an optical device according to the seventh embodiment. The configuration of the optical device according to the seventh embodiment is similar to the configuration according to the sixth embodiment. However, in the seventh embodiment, only one domain inversion area 63 is formed on the substrate 10. Accordingly, in the optical modulator A, the input side portion of the interaction area by the signal electrode 12 is arranged in the non-domain inversion area, and the output side portion of the interaction area is arranged in the domain inversion area 63. On the other hand, in the optical modulator B, the input side portion of the interaction area by the signal electrode 22 is arranged in the domain inversion area 63, and the output side portion of the interaction area is arranged in the non-domain inversion area.

According to this configuration, the domain inversion area is more simply designed than the configuration illustrated in FIG. 10, thereby improving the production yield.

Figure 12:
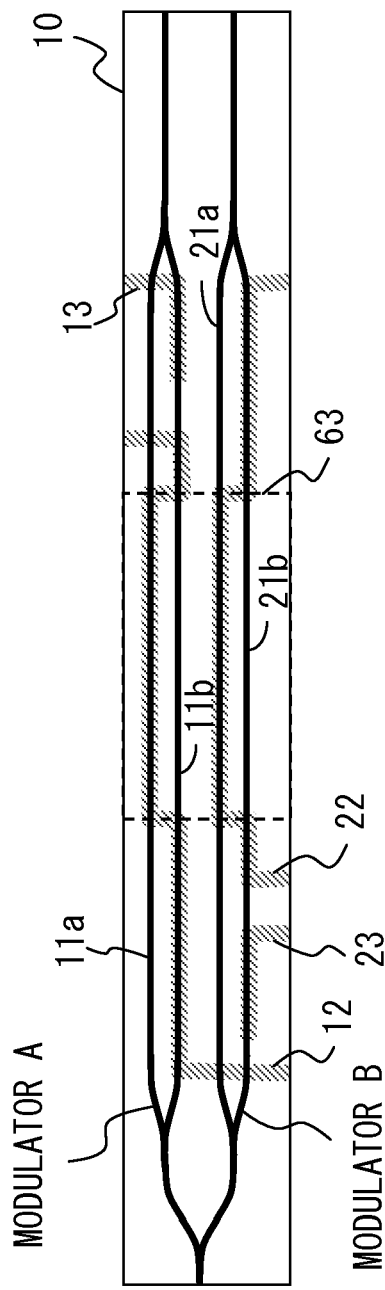
FIG. 12 and FIG. 13 illustrate variations of the seventh embodiment.
Figure 13:
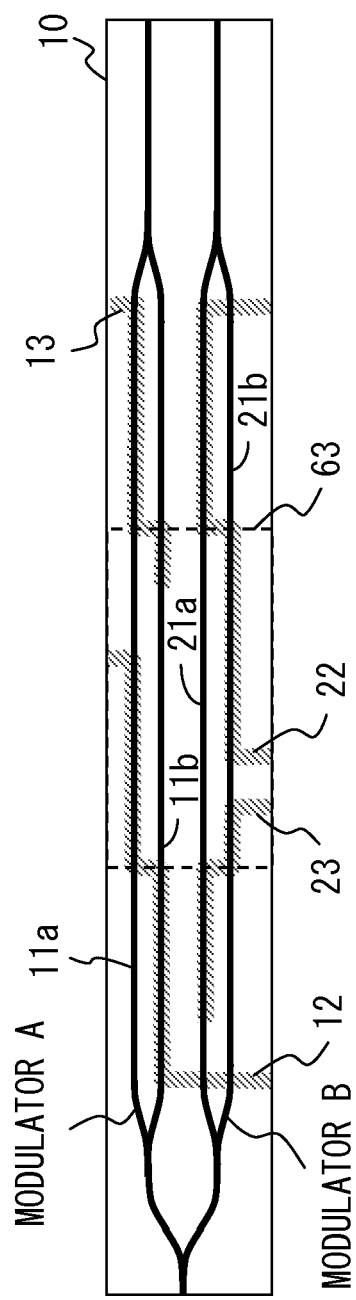

FIGS. 12 and 13 illustrate variations of the seventh embodiment. In the embodiment illustrated in FIG. 12, in the optical modulator A, the signal electrode 12 is arranged along the optical waveguide 11*b* in the non-domain inversion area on the input side of the domain inversion area 63, arranged along the optical waveguide 11*a* in the domain inversion area 63, and arranged along the optical waveguide 11*b* in the non-domain inversion area on the output side of the domain inversion area 63. Likewise, in the optical modulator B, the signal electrode 22 is arranged along the optical waveguide 21*b* in the non-domain inversion area on the input side of the domain inversion area 63, arranged along the optical waveguide 21*a* in the domain inversion area 63, and is arranged along the optical waveguide 21*b* in the non-domain inversion area on the output side of the domain inversion area 63.

In the embodiment illustrated in FIG. 13, a part of the DC electrode 13 and a part of the DC electrode 23 are arranged in the domain inversion area 63, respectively. Specifically, the DC electrode 13 is arranged along the optical waveguide 11*a* in the non-domain inversion area, and is arranged along the optical waveguide 11*b* in the domain inversion area 63. The DC electrode 23 is arranged along the optical waveguide 21*a* in the non-domain inversion area, and is arranged along the optical waveguide 11*b* in the domain inversion area 63.

Figure 14:
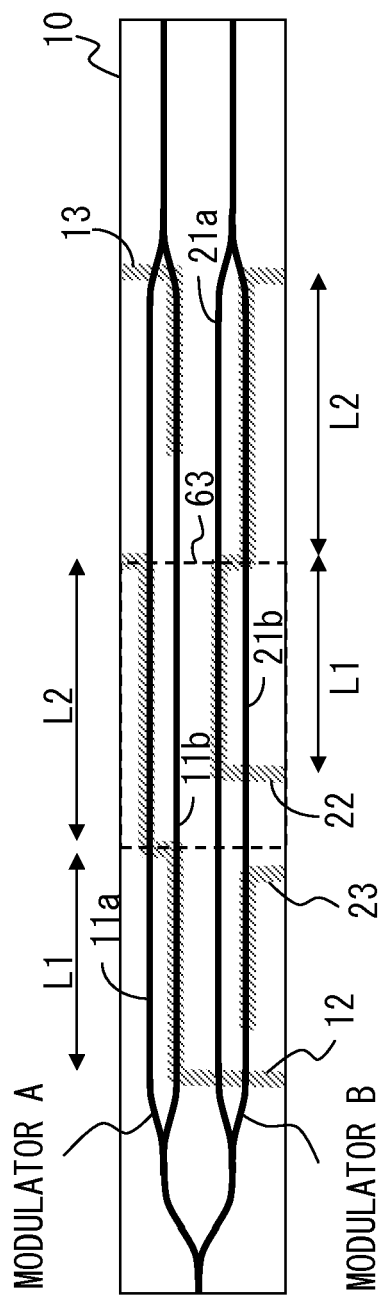
FIG. 14 illustrates an optical device according to the eighth embodiment.

FIG. 14 illustrates an optical device according to the eighth embodiment. The configuration of the optical device according to the eighth embodiment is similar to the configuration according to the seventh embodiment. However, according to the eighth embodiment, the interaction length L2 is longer than the interaction length L1. The interaction length L1 is the length of the interaction area formed in the non-domain inversion area by the signal electrode 12 in the optical modulator A, and the length of the interaction area formed in the domain inversion area 63 by the signal electrode 22 in the optical modulator B. The interaction length L2 is the length of the interaction area formed in the domain inversion area 63 by the signal electrode 12 in the optical modulator A, and the length of the interaction area formed in the non-domain inversion area by the signal electrode 22 in the optical modulator B.

In the optical device with the configuration above, the high frequency component of the data signal is attenuated when the data signal is propagated through the signal electrode.

Therefore, for example, if it is assumed that L1=L2 in the optical modulator A, the electro-optical effect by the data signal RF-A is high in the non-domain inversion area, and low in the domain inversion area 63. In this case, there is the possibility that the chirp of the modulated signal is be sufficiently suppressed. Therefore, the optical device of the eighth embodiment is designed as follows. Each of the modulators A and B has first and second interaction areas. The first interaction area is formed closer to the input portion of the corresponding signal electrode comparing with the second interaction area. That is, data signal is propagated through the first interaction area and then through the second interaction area. In addition, when the first interaction area is formed in the non-domain inversion area, the second interaction area is formed in the domain inversion area 63. On the other hand, when the first interaction area is formed in the domain inversion area 63, the second interaction area is formed in the non-domain inversion area. And the interaction length (L1) of the first interaction area is designed to be longer than the interaction length (L2) of the second interaction area. According to this configuration, the zero-chirp control is improved in the eighth embodiment.

Figure 15:
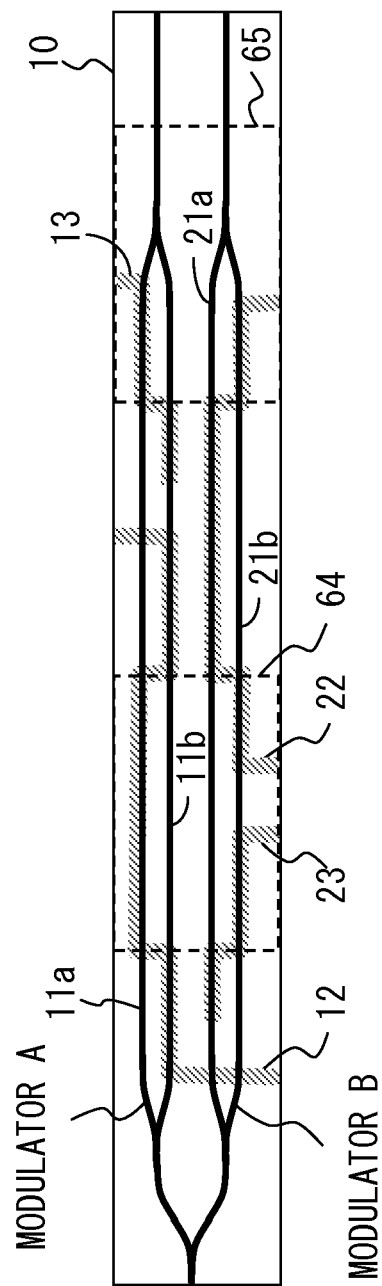
FIG. 15 illustrates a variation of the eighth embodiment.

FIG. 15 illustrates a variation of the eighth embodiment. The configuration in FIG. 15 includes domain inversion areas 64 and 65 formed on the substrate 10. In the optical modulator A, the signal electrode 12 is arranged along the optical waveguide 11b in the non-domain inversion area at the input side of the domain inversion area 64, arranged along the optical waveguide 11a in the domain inversion area 64, and arranged along the optical waveguide 11b in the non-domain inversion area at the output side of the domain inversion area 64. In the optical modulator B, the signal electrode 22 is arranged along the optical waveguide 21b in the domain inversion area 64, arranged along the optical waveguide 21a in the non-domain inversion area between the domain inversion areas 64 and 65, and arranged along the optical waveguide 21b in the domain inversion area 65. With the configuration, the chirp is suppressed in a wide band by appropriately designing the interaction length of each area without degrading the balance of red chirp and blue chirp in the high frequency area of the data signal.

Figure 16:
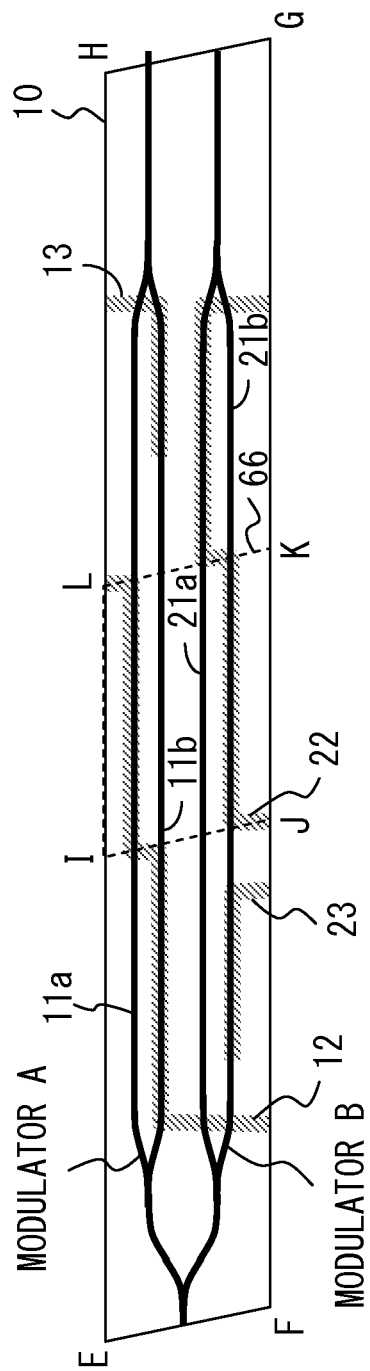
FIG. 16 illustrates an optical device according to the ninth embodiment.

FIG. 16 illustrates an optical device according to the ninth embodiment. In the ninth embodiment, the substrate 10 is a parallelogram. That is, the CW light generated by the laser light source 2 is obliquely input to the substrate 10 with respect to the input edge surface. The modulated optical signal generated by the optical modulator is obliquely output from the substrate 10 with respect to the output edge surface. Accordingly, the reflection loss is reduced.

The configuration of the optical waveguide and the electrode according to the ninth embodiment is similar to the configuration according to the seventh embodiment illustrated in FIG. 11. However, in the ninth embodiment, the shape of a domain inversion area 66 is parallelogram IJKL. The sides IJ and LK of the domain inversion area 66 are parallel to the sides EF and HG of the substrate 10. With the configuration, a manufacturing process of generating the domain inversion area is simpler.

The embodiments illustrated in FIGS. 5 through 16 are described by assuming that the substrate 10 is a Z cut substrate, but the invention is not limited to this assumption. That is, the substrate 10 may be an X cut substrate. When the substrate 10 is an X cut substrate, a signal electrode, a DC electrode, and an phase control electrode are not formed right above the corresponding optical waveguide, but formed close to the corresponding optical waveguide.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. An optical device provided with first and second QPSK optical modulators formed on a substrate having electro-optical effect, wherein
    the first QPSK optical modulator comprises a first pair of sub-Mach-Zehnder waveguides;
    the second QPSK optical modulator comprises a second pair of sub-Mach-Zehnder waveguides;
    in the first QPSK optical modulator, a first phase control electrode for providing a control signal to control a phase of the first pair of sub-Mach-Zehnder waveguides is formed at an output side of the first pair of sub-Mach-Zehnder waveguides; and
    in the second QPSK optical modulator, a second phase control electrode for providing a control signal to control a phase of the second pair of sub-Mach-Zehnder waveguides is formed at an input side of the second pair of sub-Mach-Zehnder waveguides.

2. The optical device according to claim 1, wherein
    the first QPSK optical modulator comprises:
        a first signal electrode configured to provide a data signal for the first pair of sub-Mach-Zehnder waveguides; and
        a first DC electrode, arranged at an output side of the first signal electrode, and configured to provide first DC voltage for the first pair of sub-Mach-Zehnder waveguides; and
    the second QPSK optical modulator comprises:
        a second signal electrode configured to provide a data signal for the second pair of sub-Mach-Zehnder waveguides; and
        a second DC electrode, arranged at an input side of the second signal electrode, and configured to provide second DC voltage for the second pair of sub-Mach-Zehnder waveguides.

3. The optical device according to claim 1, wherein
    at least one of the first and second phase control electrodes passes an area between the first and second QPSK optical modulators.

4. An optical device provided with first and second QPSK optical modulators formed on a substrate having electro-optical effect, wherein
    the first QPSK optical modulator comprises a first sub-Mach-Zehnder waveguide and a second sub-Mach-Zehnder waveguide;
    the second QPSK optical modulator comprises a third sub-Mach-Zehnder waveguide and a fourth sub-Mach-Zehnder waveguide;
    in the first QPSK optical modulator, a first phase control electrode for providing a control signal to control a phase of the first sub-Mach-Zehnder waveguide and a phase of the second sub-Mach-Zehnder waveguide is formed at an output side of the first sub-Mach-Zehnder waveguide and the second sub-Mach-Zehnder waveguide; and in the second QPSK optical modulator, a second phase control electrode for providing a control signal to control a phase of the third sub-Mach-Zehnder waveguide and a phase of the fourth sub-Mach-Zehnder waveguide is formed at an input side of the third of sub-Mach-Zehnder waveguide and the fourth sub-Mach-Zehnder waveguide.

* * * * *